Sept. 11, 1951  J. J. McKEAGUE  2,567,439
SAFETY VALVE
Filed Jan. 18, 1947  2 Sheets-Sheet 1
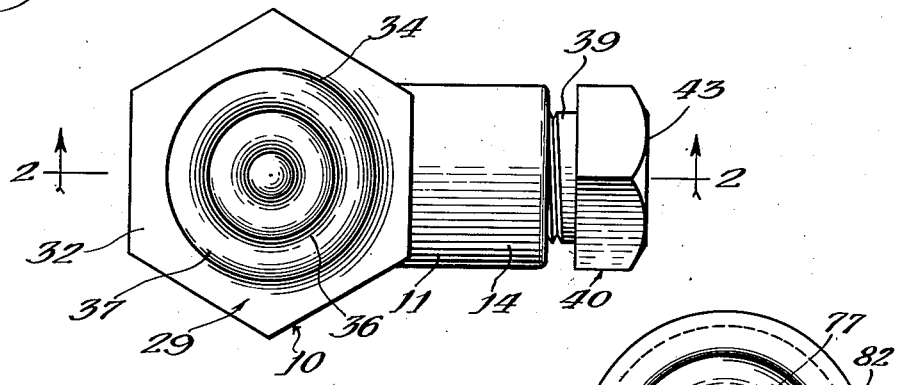
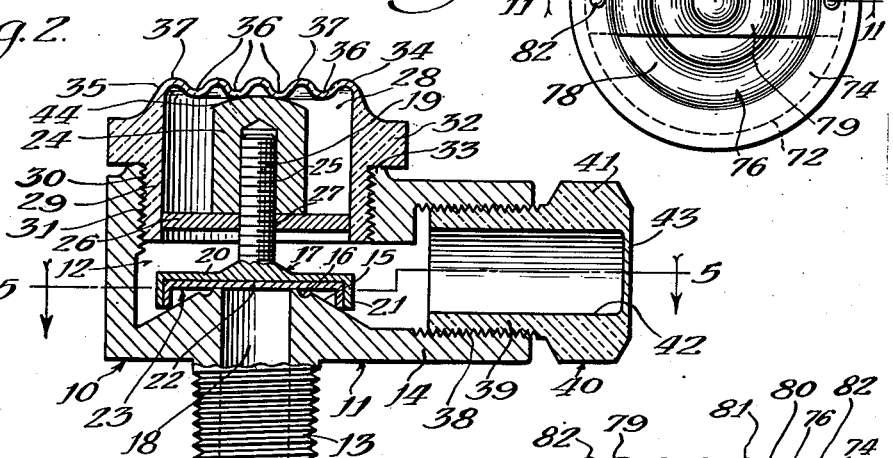
Inventor:
James J. McKeague
By: Wallace and Cannon
Attorneys Sept. 11, 1951       J. J. McKEAGUE       2,567,439
SAFETY VALVE
Filed Jan. 18, 1947                     2 Sheets-Sheet 2
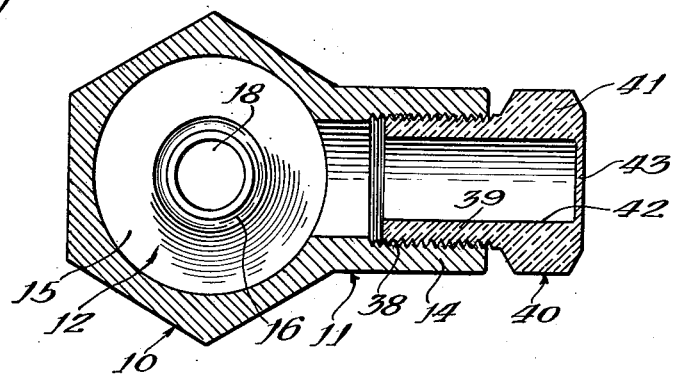
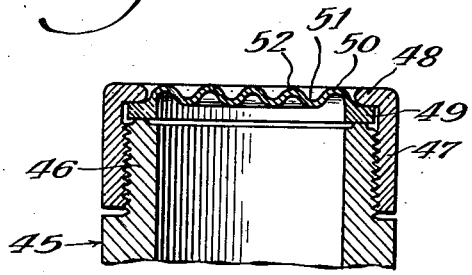
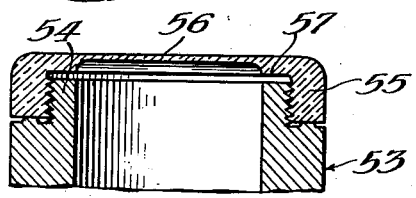
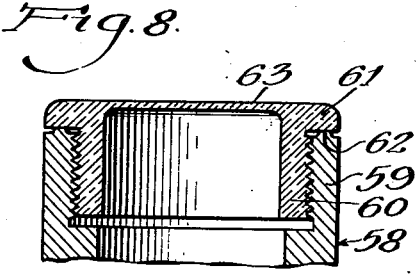
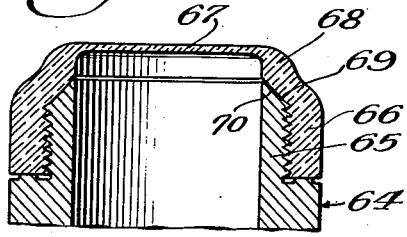
Inventor:
James J. McKeague
By: Wallace and Cannon
Attorneys Patented Sept. 11, 1951

2,567,439

UNITED STATES PATENT OFFICE 2,567,439

SAFETY VALVE

James J. McKeague, Chicago, Ill.

Application January 18, 1947, Serial No. 722,773

22 Claims. (Cl. 137—53)

This invention relates to a safety valve which is especially adapted for use in conjunction with and upon gas and vapor pressure lines and systems including refrigeration lines and systems, gas and vapor lines and systems employed in the petroleum industry, and elsewhere.

More particularly, the present invention relates to a safety valve which may embody a rupturable member on the outlet side thereof.

It has not been practical heretofore to employ a rupturable safety member on the outlet side of prior safety valves. This has been due largely to the fact that if gas or vapor under pressure leaks into the body or interior of such prior safety valves it tends to accumulate and to build up pressure therein and thus to lock the movable valve member in closed position upon its seat and against opening or to raise the pressure release point of the movable valve member to a danger point, depending upon the pressure built up in the body of the valve and the effective surface area on the inner side of the movable valve member and on which the accumulated gas or vapor pressure in the body or main chamber of the valve is exerted. Thus, for example, assuming that the movable valve member in such a prior safety valve were set to release at a pressure of 200 pounds per square inch and that the spring embodied in the said safety valve member is set accordingly to yield at this pressure and thus allow the movable valve member to open, that is, to be raised off its seat. Assuming further that gas or vapor should leak past the movable valve member until a pressure of 25 pounds per square inch has accumulated or has been built up in the body or main chamber of the said safety valve member and that the total surface area of the back or inner side of the movable valve member is one square inch. Such an accumulated pressure of 25 pounds per square inch in the body or main chamber of the said safety valve member would then be effective to increase the release point of the movable valve member significantly beyond its normal release pressure point of 200 pounds per square inch or, in other words, to a pressure release point consisting of the normal yielding pressure of the spring (200 pounds per square inch) and the accumulated pressure of the gas or vapor in the main chamber or body of the safety valve member. Thus a dangerous condition would be built up in the gas or vapor line or system with which such a safety valve might be associated.

Refrigerant gases are extremely difficult to retain and most prior safety valves leak and seep, which results in costly losses of valuable gases. Moreover, repair and service men often when finding a leaking valve, cap or plug the outlet to retain the refrigerant in the system until such time as replacement can be made. During this period the vessel or system has no protection from over-pressure and many serious accidents have taken place.

Also, snow and water and foreign matter tend to enter the housings of such conventional prior safety valves through the outlet and vent openings thereof and, in so doing, tend to rust the coil springs and other ferrous metal parts embodied therein, thereby rendering such prior safety valves unreliable in their operation and as to their pressure yielding point, and necessitating frequent repair and replacement of the ferrous metal working parts embodied therein.

In order to overcome the foregoing difficulties and unsafe conditions experienced in the use of prior safety valves of the character referred to above, some manufacturers of refrigeration equipment place the rupture member between the safety valve and the gas or vapor pressure line or system with which it is associated so that if and when the rupturable safety member bursts the safety valve comes into operation. However, this arrangement is objectionable for the reason that in order to replace the rupturable member all of the gas or vapor must be removed from the gas or vapor pressure line or vessel with which the rupturable member is associated and this frequently results in the loss of substantial quantities of relatively expensive gases or vapors such, for example, as those which are used in refrigeration systems.

In an endeavor to overcome the foregoing and other difficulties experienced in the use of prior safety valves, valve manufacturers of certain safety valves attach the movable valve member to an expansible bellows member (sometimes referred to as a "Sylphon"), which is arranged in the body or main chamber of the valve housing.

In the aforesaid prior safety valves embodying an expansible bellows member, a housing or cap is employed for retaining the expansible bellows member in place and for the support of the spring which supplies the required tension and the outlet of the valve is provided with a frangible or rupturable disc. If this type of valve develops a leak and gas or vapor will seep past the contact between the movable valve member and its seat and, as a result, a gas or vapor pressure will build up in the body of the valve. This pressure tends to contract the expansible bellows member against the tension of the spring and thus tends to open the valve. However, should gas or vapor leak or seep through the expansible bellows member, due to cracks, pin holes, imperfect soldering, etc., and accumulate in the housing enclosing the expansible bellows member and spring, this pressure will neutralize the action of the expansible bellows member and a locking action will take place, similar to that which takes place in conventional safety valves.

To overcome the danger of this possible locking action, manufacturers of this type of valve provide a vent port or small hole in the expansible bellows member and spring housing to allow for the escape of any gas or vapor which may leak or seep through the expansible bellows member. Such prior safety valves embodying an expansible bellows member work, in general, quite satisfactorily as long as the atmospheric vent port or opening formed in the spring housing is open and free to perform its intended function of allowing any gases or vapor which may leak through the expansible bellows member to be relieved by the escapement to the atmosphere through the said vent port or opening. However, it quite frequently happens in the use of such prior safety valves that the said vent opening or port therein will become plugged with accumulated foreign matter and nullify the purpose for which it was provide.

Also, the expansible bellows members embodied in such prior safety valves are expensive and, as a result, there are relatively few of such safety valves in use and their use has been confined primarily to relatively large gas and vapor pressure systems.

Accordingly, a primary object of the present invention is to provide a new and improved and relatively simple safety valve which may embody a rupturable member on the outlet side thereof, and for use in gas and vapor pressure lines, vessels and systems, and which in use is free from and overcomes and eliminates the foregoing and other objectionable features of the prior safety valves to which reference has been made above.

Another object of the present invention is to provide a new and improved safety valve which may embody a rupturable member on the outlet side thereof for use in gas and vapor pressure lines and systems, and which does not embody either a coil spring or an expansible bellows member for controlling the pressure release point and operation of the movable valve member, such as have been embodied in prior safety valves and with the consequent disadvantages referred to above, and in which the pressure release point and operation of the movable valve member are under the sole control of a flexible diaphragm embodied in the new safety valve.

A further object of the present invention is to provide a new and improved safety valve which may embody a rupturable member on the outlet side thereof for use in gas and vapor pressure lines and vessels and in which any gas or vapor pressure which may build up or accumulate in the body or main chamber of the new safety valve will tend to open or unseat the movable valve member rather than tending to close or seat the movable valve as in certain of the comparable prior safety valves which have been referred to above.

Still another object of the present invention is to provide a new and improved and relatively simple safety valve which may embody a rupturable member on the outlet side thereof, and for use in gas or vapor pressure lines or vessels, and in the use of which the movable valve member will remain open or in unseated position until the pressure in the line or vessel has been reduced to the point at which the movable valve member will be automatically closed or reseated, whereupon the rupturable member may be readily replaced, once it has been ruptured, without removing the new safety valve from the gas or vapor pressure line or vessel with which it is associated, and without removing the gas or vapor from the pressure line, vessel, or system with which the new safety valve may be associated.

A further object of the present invention is to provide a new and improved and relatively simple safety valve in which the movable valve member, after having been unseated, may be readily reseated in case of leakage or seepage between the movable valve member and its seat by merely tapping the flexible wall of the valve housing with a light tool, such as the handle of a screwdriver, and without disassembling the safety valve member as has been necessary in the use of certain of the prior safety valve members, embodying an expansible bellows member.

Still further objects of the present invention are: to provide a new and improved and relatively simple and inexpensive safety valve which does not require a special cover or cap as is required in safety valves embodying an expansible bellows member; which is free from any vent port or opening for the entrance of snow, water and other foreign matter and which is otherwise so constructed that water, snow and other foreign matter cannot enter into the body of the new safety valve to interfere with the operation thereof; which is so constructed that once it has been assembled and adjusted and the new safety valve applied in position of use interference with its properly adjusted working parts is prevented; which may be readily clamped in position of use upon a pressure line or vessel without damaging or distorting or otherwise interfering with the flexible diaphragm embodied in the new safety valve; and which is so constructed and arranged that the flexible diaphragm cap member embodied therein has a gas or vapor tight threaded sealing engagement with a portion of the main valve housing in which it is mounted so that the use of a sealing gasket at this point is eliminated.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a top plan view illustrating a preferred embodiment of the new safety valve;

Fig. 2 is a central vertical sectional view on line 2—2 in Fig. 1;

Fig. 3 is an elevational view of the combination movable valve member, guide unit and adjustment barrel therefor which are embodied in the new safety valve;

Fig. 4 is a top plan view on line 4—4 in Fig. 3 showing the combination movable valve member, guide unit and adjustment barrel therefor shown in Fig. 3;

Fig. 5 is a sectional plan view on lines 5—5 in Fig. 2;

Fig. 6 is a fragmentary central vertical sectional view illustrating a modified form of a flexible diaphragm cap which may be embodied in the new safety valve;

Fig. 7 is a fragmentary central vertical sectional view illustrating another modification of a flexible diaphragm cap which may be embodied in the new safety valve;

Fig. 8 is a fragmentary central vertical sectional view illustrating a further modified form of a flexible diaphragm cap which may be embodied in the new safety valve;

Fig. 9 is a fragmentary central vertical sectional view illustrating still another modified form of the new safety valve;

Fig. 10 is a fragmentary top plan view illustrating an additional modification of a flexible diaphragm cap and auxiliary resilient tensioning member therefor which may be embodied in the new safety valve; and Fig. 11 is a central vertical sectional view on line 11—11 in Fig. 10.

A safety valve embodying a typical form of the present invention is illustrated in Figs. 1 to 5, inclusive, of the drawings wherein it is generally indicated at 10, and comprises a valve housing or body 11 which may be made of brass or other suitable metal. The valve housing 11 includes a main internal chamber 12 having an externally threaded inlet nipple 13 and an internally threaded outlet nipple 14. The bottom wall of the internal chamber 12 of the valve housing 11 is formed by a substantially conical-shaped valve seat 15 in the inner surface of which an annular groove 16 is provided. A movable valve member 17 is normally seated upon the valve seat 15 so as to close the inlet passage 18 from the inlet nipple 13 into the interior or main internal chamber 12 of the valve housing 11. To this end the movable valve member 17 includes a valve stem 19 which has a base or head 20 formed thereon at the lower end thereof and this head 20 has a depending annular flange or skirt 21 formed integral therewith, as shown in Figs. 2 and 3. A flexible sealing gasket 22, which may be made of any suitable material such, for example, as synthetic resinous materials including "Saran," "Resistoflex," "Neoprene" or other suitable materials, is attached to the head 20 of the valve member 17 and its depending annular skirt 21 on the inner side of the latter, as shown in Figs. 3 and 4. The annular flange portion of the sealing gasket 22 normally bears upon the valve seat 15 to provide a secondary seal and the body or main extent of the sealing gasket 22 normally bears upon the valve seat 15 about the inlet 18 to provide the primary seal between these parts. This arrangement provides an area or compartment 23 between the stationary valve seat 15 and the flexible sealing gasket 22 (Fig. 2) when the movable valve member and the sealing gasket 22 carried thereby are in closed position, as in Fig. 2.

The valve stem 19 is externally threaded and has a substantially cylindrical manually operable adjustment barrel or member 24 mounted thereon. This manually operable adjustment barrel or member 24 is provided with a centrally arranged and threaded opening 25 for the reception of the externally threaded valve stem 19 (Fig. 2). A substantially square combination lock washer and guide member 26 is mounted on the threaded stem 19 of the movable valve member 17 and to this end the combination lock washer and guide member 26 is provided with a centrally arranged threaded opening 27 for the reception of the threaded stem 19 of the valve member 17. The substantially square combination lock washer and guide member 26 (Fig. 4) is slidably mounted in the internal cylindrical cavity 28 of a substantially cylindrical flexible diaphragm cap member 29 which may be made of a suitable synthetic resinous plastic material, or other suitable material which will be described hereinafter. The side wall of this flexible diaphragm cap member 29 is externally threaded, as at 30, and is removably and tightly or closely threaded into an internally threaded portion 31 of the body of the valve housing 11. The flexible diaphragm cap member 29 has an enlarged and substantially annular clamping flange 32 which normally bears upon the upper edge 33 of the internal chamber 12 in the valve housing 11 (Fig. 2).

The flexible diaphragm cap member 29, which is embodied in the new safety valve 10, may be made of any suitable synthetic resinous thermoplastic material such, for example, as vinylidene chloride copolymer ("Saran"—Dow Chemical Co.), or, but less desirably, of metal of suitable flexibility, strength and other characteristics, and embodies at its outer end an elastic flexible diaphragm 34 which is molded as an integral part of the flexible diaphragm cap member 29. As shown in Fig. 2 the elastic flexible diaphragm 34 is joined along its marginal or peripheral edge to a wall 35 of gradually varying thickness and which is integral with the side wall of the flexible diaphragm cap member 29. In order to increase its flexibility, the elastic flexible diaphragm 34 has formed therein a series of concentric annular corrugations which are formed by grooves 36 alternated with corresponding raised annular concentric ribs 37. The innermost corrugation or annular groove 36 bears down at its underside upon the convexly rounded upper end portion or surface 44 of the substantially cylindrical manually operable adjustment barrel member 24 which is mounted on the valve stem 19, as shown in Fig. 2.

The outlet nipple 14 of the valve body 11 is internally threaded, as at 38 (Fig. 2) and the externally threaded shank 39 of a safety member in the form of a plug 40 is removably threaded into the internally threaded outlet nipple 14. The safety member or plug 40 has an enlarged clamping flange or shoulder 41 which is disposed externally of the outer end of the outlet nipple 14 and the safety member or plug 40 has an internal cavity or chamber 42 which communicates by way of the outlet nipple 14 with the main chamber or cavity 12 in the valve body 11. The outer end of the safety member or plug 40 is closed by an elastic flexible diaphragm 43 which is formed as an integral part of the safety member or plug 43, as shown in Fig. 2.

The plastic resinous flexible diaphragm cap member 29 is tightly threaded into the portion 31 of the metal body of the valve housing 11 and this tight plastic-to-metal sealing engagement of these parts provides a gas and vapor tight seal and eliminates the necessity for a sealing gasket at this point.

The use and operation of the form of the new safety valve shown in Figs. 1 to 5, inclusive, of the drawings are as follows: The new safety valve 10 may be attached by its externally threaded inlet nipple 13 to a gas or vapor pressure line, system, or vessel, whereupon gas or vapor under pressure will enter the valve inlet 18. However, the valve head 20—22 is normally seated upon the valve seat 15 by reason of the fact that the elastic flexible diaphragm 34 presses downwardly upon the rounded upper surface 44 of the manually operable adjustment barrel member 24 with sufficient force to maintain the valve head 20—22 upon its seat 15 and thus prevent gas or vapor under pressure from entering the valve body 11 by way of the valve inlet 18.

It will be noted, in this connection, that the manually operable adjustment barrel member 24 may be manually adjusted upon and axially of the threaded valve stem 19, and relative to the elastic flexible diaphragm 34, so as to vary the tension upon and the effective downward pressure of the elastic flexible diaphragm 34 upon the manually operable adjustment barrel member 24 and the valve 19—17—20—22 upon which the said manually operable adjustment barrel member 24 is mounted and so as to vary correspondingly the gas or vapor pressure release point at which the valve head 17—20—22 will be raised off its seat 15. The combination lock washer and guide member 26 may likewise be manually adjusted upon and axially of the threaded valve stem 19 so that it is at all times disposed immediately below and in contact with the bottom surface of the manually operable adjustment barrel member 24. Hence the member 26 functions both as a guide member and as a lock nut to retain the manually operable adjustment member 24 in a preselected adjusted position on the valve stem 19 and against accidental displacement therefrom.

If and when the pressure of the gas or vapor entering the valve body 11 by way of the inlet nipple 13 and inlet passage 18 becomes greater than the effective pressure exerted by the elastic flexible diaphragm 34 upon the valve head 17—20—22, by way of the manually operable adjustment member 24 and the valve stem 19, gas or vapor from the line or vessel with which the new safety valve is associated will enter the valve body 11 by way of the inlet nipple 13 and inlet passage 18 and will thereupon act upon the bottom surface of the valve body 20—22 to raise the valve head 17—20—22 off its seat 15, thereby first breaking the primary seal between the sealing gasket 22 and that portion of the stationary valve seat 15 which defines the marginal edge of the inlet 18. As the primary seal between the sealing gasket 22 and the valve seat 15 is thus broken the incoming gas or vapor enters the auxiliary chamber 23 and thus affects and acts upon a relatively much larger surface area of the valve head 20—22 than is exposed to the pressure of the incoming gas or vapor at the primary seal between the perimeter or marginal edge of the inlet 18 and the valve seat 15. This results in a corresponding increase in the total effective force applied upon the valve head 20—22 of the movable valve member 17 to overcome the flexing action of the flexible diaphragm 34 and hence the movable valve member 17 is unseated with a quick, snap-like action. The valve stem 19 and the guide member 26 and the manually adjustable pressure control member 24 will thus be raised upwardly and the rounded upper surface 44 of the manually operable adjustment barrel member 24 will bear against the inner surface of the elastic flexible diaphragm 34 and thus exert an upwardly flexing action thereon. During this movement of the valve member 17—20—22—19 and of the manually operable adjustment barrel member 24 carried thereby the valve member 17—20—22—19 is guided within the interior 28 of the flexible diaphragm cap member 29 by the combination lock washer and guide member 26 (Figs. 2, 3 and 4) which, as shown in Fig. 4, is substantially square in design so that it has a sliding fit with the inner surface of the flexible diaphragm cap member 29, but, due to its substantially square shape (Fig. 4) has limited frictional engagement therewith.

When gas or vapor pressure in the body of the new safety valve overcomes the tension of the elastic flexible diaphragm 34 on the adjustment barrel 24 the movable valve member 17 will either assume a "floating" position in the valve housing or will rest upon the valve seat 15 under its own weight and the force of gravity acting thereon.

The annular groove 16 in the valve seat 15 serves to receive any foreign particles or matter which might otherwise accumulate on the upper surface of the valve seat 15 and interfere with either the primary or secondary seal between the parts 15 and 22.

As the valve head 17—20—22 is thus raised off its seat 15 the gas or vapor will flow into the interior or main chamber 12 of the valve body 11 and thence into the outlet nipple 14 and the interior 42 of the rupturable safety member 40 attached thereto whereupon it will press against the inner surface of the elastic flexible rupturable wall 43. The safety member 40 may be of any suitable type but for this purpose I have found that the construction disclosed in my earlier United States Patent No. 2,370,870 issued March 6, 1945 on a "Safety Device" is well suited. However, the present invention is not limited to the use of any of the safety members disclosed and claimed in my aforesaid earlier Patent No. 2,370,870, since other safety members or frangible discs may be used with the safety valve of the present invention.

The elastic flexible rupturable wall 43 may be constructed so that it will rupture at a preselected pressure so that it will yield and flex under normal and safe operating pressures in the valve body 11 but if and when a dangerous pressure condition develops within the valve body 11 and in the interior 42 of the safety member 40 the same will rupture the elastic flexible wall 43 of the safety member 40 and thereby relieve the dangerous or unsafe condition referred to. As pointed out in my aforesaid earlier Patent No. 2,370,870 the elastic flexible rupturable wall 43 may be made of a suitable synthetic thermoplastic resin for which I have found vinylidene chloride copolymer ("Saran"—Dow Chemical Co.) to be admirably suited although other synthetic resinous materials, and even metals, may be employed in making both the flexible diaphragm cap member 29 and its elastic flexible wall 34 and the safety member or plug 40 and its elastic flexible rupturable wall 43.

After the elastic flexible rupturable wall 43 is thus ruptured to relieve a dangerous or unsafe pressure condition in the vessel so protected, the elastic flexible diaphragm 34 embodied in the elastic flexible diaphragm cap 29 will then act upon the manually operable adjustment barrel member 24 and its upper rounded surface 44 and through the valve stem 19 to reseat the movable valve head 17—20—22 upon its seat 15, with a relatively fast or quick and snap-like action, and thus prevent further loss of gas or vapor from the pressure line, vessel or system which the new safety valve is associated. If a dangerous or overpressure condition still exists in the gas or vapor pressure line or system, relative to the pressure release point of the new safety valve, the movable valve member 17 will be raised off its seat 15, thereby relieving the excess pressure until a pressure condition is reached at which the movable valve member 17 will reseat upon its seat 15. The new safety valve will then function as an ordinary safety valve until the ruptured safety member or plug 40 may be unscrewed from within the internally threaded outlet nipple 14 and replaced by a new rupturable safety member 40.

If the movable valve member 17—20—22 should for any reason fail to reseat itself tightly upon its seat 15, due to the presence of foreign particles or dirt on the seat 15, the upper surface of the elastic flexible diaphragm 34 or the side wall flange 32 of the elastic flexible diaphragm cap 29 may be tapped lightly with a suitable small instrument, such as the handle of a screwdriver, so as to firmly reseat the movable valve member 17—20—22 upon its seat 15, whereupon the elastic flexible diaphragm 34 will function to hold the movable valve member 17—20—22 firmly upon its seat 15.

The combination lock washer and guide member 26 and the substantially conical shape of the valve seat 15 assure that the movable valve member 17—20—22 will at all times be properly reseated upon the valve seat 15 so as to close the mouth of the inlet passage 18 therethrough at the primary seal between the sealing gasket 22 on the valve head 20 and the marginal edge of the inlet opening 18 through the valve seat 15.

It will be noted that the elastic flexible diaphragm 34 serves the function of and replaces the conventional coil spring embodied in the prior safety valves of a comparable character or type, and that which the rupturable safety member or plug 40 is arranged on the outlet side of the new safety valve the difficulties referred to hereinbefore and which have heretofore been experienced in the use of prior safety valves are overcome and substantially eliminated. Moreover, once the manually operable adjustment barrel 24 has been properly adjusted to the desired pressure and working conditions and the new safety valve 10 is sealed by a suitable seal (not shown) the internal parts thereof cannot be tampered with or readjusted until the seal is broken.

It will also be noted that if in the use of the new safety valve shown in Figs. 1 to 5, inclusive, gas or vapor should seep past the point of contact or primary seal between the movable valve member 17—20—22 and its seat 15 and accumulate in the interior 12 of the valve body 11 such gas or vapor will exert substantially the same and an equal pressure upon both the undersurface of the elastic flexible diaphragm 34 and upon the upper or inner surface of the movable valve member 17—20—22. The two opposing forces thus developed, one tending to unseat the movable valve member 17—20—22 and the other tending to seat the same, will counterbalance or offset each other and no dangerous condition will thus be developed within the interior 12 of the valve body 11 which might cause the movable valve member 17—20—22 to remain fixedly closed or seated against the pressure of the gas or vapor in the inlet nipple 13 and its inlet passage 18. One of the hazards experienced in the use of comparable safety valves employing a coil spring and embodying a rupturable disc arranged on the outlet side thereof is thus eliminated in the use of the new safety valve 10 shown in Figs. 1 to 5, inclusive, of the drawings.

Moreover, the new safety valve embodying the construction thus described, and as shown in Figs. 1 to 5, inclusive, of the drawings, does not embody any cap or other enclosure arranged over the flexible elastic diaphragm corresponding to the caps arranged over the valve-reseating coil springs and expansible bellows members in the prior safety valves of a comparable character and in which caps or enclosures it has been customary to provide an escape vent or port to the atmosphere in case of a leak in the expansible bellows member with the consequent likelihood of building up an opposing or locking pressure condition within the expansible bellows member if and when the aforesaid vent opening or port should become clogged or filled with accumulated foreign matter.

In the construction of the new safety valve 10 which is illustrated in Figs. 1 to 5, inclusive, of the drawings, the flexibility of the elastic flexible diaphragm 34 is materially increased by the concentric annular grooves 36 and ribs 37 formed therein, thereby materially increasing the effective travel distance or permissible movement of the movable valve member 17—20—22—19 in the valve body 11.

The ratio of the surface area of the elastic flexible diaphragm 34 to the surface area of that portion of the valve head 17—20—22 which is normally disposed across and closing the inlet passage 18 is preferably in the order of from 7 to 10, inclusive, to 1. This ratio and the wall thickness of the elastic flexible diaphragm 34 are preferably increased as the release point pressure of the safety valve 10 is increased. Thus, for example, for a ¼" valve having a surface area of 0.049 sq. in. at and in contact with the inlet passage 18 the internal diameter of the elastic flexible diaphragm 34 should be approximately ¾" and the thickness of the elastic flexible diaphragm 34 should be approximately $\frac{3}{32}$" or 0.093" for a release pressure of 200 lbs. per square inch, when the elastic flexible diaphragm cap 29 and the elastic flexible diaphragm 34 which is formed as an integral part thereof are formed of vinylidene chloride copolymer ("Saran"—Dow Chemical Co.).

The side wall of the elastic flexible diaphragm cap 29 and the clamping flange 32 thereon are substantially thicker than the elastic flexible diaphragm 34 so that the elastic flexible diaphragm 34 is not weakened or distorted when a tool is placed about the flange 32 to insert the flexible diaphragm cap member 34 into or to remove the same from the valve body 11.

A modification of the flexible diaphragm cap member of the present invention is illustrated in Fig. 6 of the drawings wherein a portion of a valve body, comparable to the valve body 11, is generally indicated at 45. This portion 45 of the valve body is adapted to house a combination lock washer and valve guide 26 and valve assembly 17 associated therewith, such as are shown in Fig. 4. In this modification of the invention the portion 45 of the valve body has an externally threaded neck 46 onto which an internally threaded clamping separate ring 47 is detachably threaded. This clamping ring 47 has an inwardly extending annular clamping flange 48 at the top thereof and this clamping flange 48 is adapted to have clamping engagement with a substantially annular marginal side wall 49 which is formed integrally with an elastic flexible diaphragm cap member 50. The elastic flexible diaphragm cap member 50 is provided with concentric annular grooves 51 and ribs 52 and is otherwise comparable to the elastic flexible diaphragm cap member 34 which is embodied in the form of the invention shown in Figs. 1 to 5, inclusive, and may be made of the same material.

The modified form of the new flexible diaphragm cap shown in Fig. 6 is somewhat less expensive in construction than, and differs from, the elastic flexible diaphragm cap 29 embodied in the form of the invention illustrated in Figs. 1 to 5, inclusive, in being formed as a separate unit and by being removably clamped in position of use upon the portion 45 of the valve body by means of the separate clamping ring 47 and its clamping flange 48.

A further modification of the elastic flexible diaphragm cap member of the present invention is illustrated in Fig. 7 of the drawings wherein a portion of a valve body, comparable to the valve body portion 45 shown in Fig. 6, is generally indicated at 53 and has an externally threaded portion 54 on which an internally threaded elastic flexible diaphragm cap member 55 is detachably threaded. The elastic flexible diaphragm cap member 55 is preferably made of a suitable synthetic thermoplastic resinous material, such as vinylidene chloride copolymer ("Saran"— Dow Chemical Co.) and embodies a substantially flat and uniplanar elastic flexible diaphragm 56 which extends thereacross at one end of the valve body portion 53—54 and outwardly of a relatively thicker annular shoulder 57 formed thereon. This relatively thicker shoulder 57 prevents damage to or distortion of the elastic flexible diaphragm 56 during the operation of screwing the cap member 55 into position of use and removing it therefrom.

An additional modification of the elastic flexible diaphragm cap member of the present invention is illustrated in Fig. 8 of the drawings wherein a portion of a valve body is generally indicated at 58 and has an internally threaded portion 59 in which an externally threaded elastic flexible diaphragm cap member 60 is threadedly mounted. The internally threaded elastic flexible diaphragm cap member 60 is preferably made of a suitable synthetic resinous plastic, such as vinylidene chloride copolymer, and embodies a substantially annular wall or shoulder 61 which is adapted to seat upon a substantially annular shoulder 62 formed upon the outer end portion 62 of the wall 59 of the portion 58 of the valve body. The elastic flexible diaphragm cap member 60 also embodies a substantially flat and uniplanar elastic flexible diaphragm 63 which extends across the outer end of the plug 60 inwardly of the substantially annular shoulder 61.

A further modification of the elastic flexible diaphragm cap member of the present invention is illustrated in Fig. 9 of the drawings wherein a portion of a safety valve body is generally indicated at 64 and has an externally threaded neck 65 on which an internally threaded elastic flexible diaphragm cap member 66 is mounted. The elastic flexible diaphragm cap member 66 is preferably made of the same synthetic resinous plastic material as that preferably employed in making the elastic flexible diaphragm cap member 29 which is embodied in the form of the invention illustrated in Figs. 1 to 5, inclusive, of the drawings, although it may be made of other suitable synthetic resinous plastics or of suitable metallic materials.

The elastic flexible diaphragm cap member 66 which is embodied in the modification of the invention illustrated in Fig. 9 embodies an inclined wall 68 having a beveled or inclined internal shoulder 69 which engages and seats upon a correspondingly formed inclined shoulder 70 which is formed on the upper end portion of the externally threaded wall 65. The elastic flexible diaphragm cap member 66 also embodies a substantially flat and uniplanar elastic flexible diaphragm 67 which extends across and closes the outer end thereof inwardly of the substantially annular shoulder 68.

In the modification illustrated in Fig. 9, there are two seals, namely, a secondary seal between the internally threaded resinous plastic elastic flexible diaphragm cap member 66 and the safety valve body 64, and a primary seal between the two contacting beveled or inclined shoulders 69 and 70.

The modifications of the elastic flexible diaphragm cap members illustrated in Figs. 7, 8 and 9 of the drawings, and embodying substantially flat and uniplanar elastic flexible diaphragms 56, 63 and 67, possess considerably less flexibility than the corrugated elastic flexible diaphragms embodied in the forms of the invention shown in Figs. 1 to 5, inclusive, and Fig. 6 but possess sufficient elasticity and flexibility to enable them to be used for many purposes.

Another modification of the invention is illustrated in Figs. 10 and 11 of the drawings and this modification of the invention is especially adapted for use in those usages and instances in which a relatively high release pressure is desired in the use of the new safety valve.

In the modification illustrated in Figs. 10 and 11 of the drawings a portion of a safety valve body is generally indicated at 71 and has an externally threaded neck 72, these parts 71—72 corresponding to the internally threaded neck portion 31 of the valve body 11 in the form of the new safety valve shown in Figs. 1 to 5, inclusive, of the drawings. The modification illustrated in Figs. 10 and 11 includes an internally threaded metal clamping ring 73 which is removably mounted upon the externally threaded wall 72 of the valve body portion 71 and this clamping ring 73 has an inwardly extending and substantially annular clamping flange or shoulder 74 formed integrally therewith at the outer end thereof.

The modification of the invention illustrated in Figs. 10 and 11 embodies an elastic flexible diaphragm 76 which is formed integrally with a substantially annular diaphragm ring 75 which is adapted to be seated on the outer end of the wall 72 of the portion 71 of the safety valve body. The elastic flexible diaphragm 76 is preferably made of the same material as is employed in forming the elastic flexible diaphragm 34 which is embodied in the form of the invention illustrated in Figs. 1 to 5, inclusive, but differs therefrom, as may be seen by comparing Fig. 2 with Fig. 11, in that in the modification illustrated in Figs. 10 and 11 the elastic flexible diaphragm 76, and the annular clamping flange 75 which is formed integral therewith, are formed separate from rather than as integral parts of the members 72 or 73, on or in association with which they are mounted.

The elastic flexible diaphragm 76 embodies a series of alternately arranged substantially annular concentric corrugations provided by grooves 77 and raised ribs 78 which correspond structurally and functionally to the alternately arranged substantially annular corrugations provided by the grooves 36 and raised ribs 37 in the form of the invention illustrated in Figs. 1 to 5, inclusive.

The modification of the invention illustrated in Figs. 10 and 11 embodies reinforcing and tensioning member in the form of a relatively narrow band or strip 79 of resilient spring steel or other suitable metal which is attached to the substantially annular shoulder 74 of the clamping ring 73 on the underside of the said shoulder, this attachment being effected by suitable attaching elements, such as rivets 82, which are mounted on the substantially annular shoulder 74 and which have their inner or lower end portions attached to the resilient metal strip or band 79.

The resilient metal strip or band 79 extends transversely and substantially diametrically across the substantially annular elastic flexible diaphragm 76 on the outer side thereof and has formed therein alternately arranged grooves or depressions 80 and raised ribs 81 which match and interfit with and upon the grooves 77 and raised ribs 78, respectively, in the elastic flexible diaphragm 76.

In the use of the modification shown in Figs. 10 and 11 the elastic flexible diaphragm 76 may be arranged in position of use by mounting its supporting ring or clamping flange 75 on the outer end of the wall 72 of the portion 71 of the safety valve body and then screwing the threaded clamping ring 73 and attached resilient metal strip or band 79 carried thereby into position of use upon the neck 72 of the portion 71 of the safety valve body until the resilient metal strip or band 79 is disposed on contacting engagement with the elastic flexible diaphragm 76 with the grooves 80 and the raised ribs 81 in the resilient metal strip 79 interfitted with the corresponding grooves 77 and raised ribs 78, respectively, in the elastic flexible diaphragm 76. When so arranged the resilient metal strip or band 79 reinforces and tensions the elastic flexible diaphragm 76 and enables the modification of the invention illustrated in Figs. 10 and 11 to be used in those instances in which a relatively high pressure valve release point is desired and in which such pressure valve release point is substantially higher than would be desired or necessary in the use of the unreinforced corrugated elastic flexible diaphragm 34—36—37 which is embodied in the form of the invention illustrated in Figs. 1 to 5, inclusive, to which the modification illustrated in Figs. 10 and 11 is otherwise similar both structurally and functionally.

While the resilient metal or spring steel band 79 is shown as being a relatively narrow strip, its width and shape and effective surface area and thickness may be varied, relative to the area of the elastic flexible diaphragm 76 over which it is arranged, so as to accommodate the elastic flexible diaphragm 76 and the resilient or spring steel member 79 arranged thereover to any pressure release point which may be desired in the safety valve in which these parts are embodied.

It will thus be seen from the foregoing description, considered in conjunction with the accompanying drawings, that the present invention provides a new and improved safety valve having the desirable characteristics and advantages hereinbefore referred to, and others inherent therein, and that the present invention thus accomplishes its intended objects including those hereinbefore referred to and others which are inherent in the invention.

I claim:

1. A safety valve comprising a valve housing having an inlet and an outlet for gas or vapor under pressure, a rupturable wall extending across the said outlet, a valve seat disposed about the said inlet, valve means movably mounted in the said valve housing and including a movable valve member adapted to seat upon the said valve seat so as to close the said inlet, and the said safety valve comprising a diaphragm cap member mounted upon the said valve housing and including an elastic flexible diaphragm extending thereacross and normally bearing upon the said valve means to urge the said movable valve member into sealing engagement with the said valve seat so as to close the said inlet opening, the said diaphragm cap member including a substantially annular clamping flange formed as an integral part thereof and surrounding and of substantially greater thickness than the said elastic flexible diaphragm.

2. A safety valve as defined in claim 1 in which the said diaphragm cap member is in the form of a threaded member adapted to be detachably mounted upon a threaded portion of the said valve housing by threaded engagement therewith.

3. A safety valve as defined in claim 1 in which the said elastic flexible diaphragm has a series of substantially annular and concentric corrugations formed therein.

4. A safety valve as defined in claim 1 in which the said elastic flexible diaphragm is formed as a substantially flat and uniplanar wall.

5. A safety valve as defined in claim 1 in which the said movable valve member has a threaded valve stem attached thereto, and in which the said threaded valve stem has a manually adjustable threaded member thereon, and in which the said manually adjustable threaded member has an end portion disposed in engagement with the inner surface of the said flexible diaphragm and is adjustable axially relative to and along the said threaded valve stem, and in which the said safety valve includes means mounted upon the said threaded valve stem between the said movable valve member and the said manually adjustable threaded member and movable therewith and slidably engageable with the inner surface of the said valve housing for guiding the movement of the said movable valve member and its said threaded valve stem and the said manually adjustable threaded member in and during movement thereof relative to the said valve seat.

6. A safety valve as defined in claim 1 in which the said movable valve member has a threaded valve stem attached thereto, and in which the said threaded valve stem has a manually adjustable member threaded thereon, and in which the said manually adjustable threaded member has an end portion disposed in engagement with the inner surface of the said flexible diaphragm and is adjustable axially along the said threaded valve stem, and in which the said valve housing includes a substantially cylindrical portion, and in which the safety valve includes a substantially square member threaded onto the said threaded valve stem between the said movable valve member and the said manually adjustable member and slidably engageable with the inner surface of the said substantially cylindrical portion of the said valve housing for locking the said manually adjustable member in a pre-selected adjusted position upon and relative to the said threaded valve stem and relative to the said elastic flexible diaphragm and for guiding the movement of the said movable valve member and the said valve stem and the said manually adjustable member in the said valve housing and relative to the said valve seat.

7. A safety device as defined in claim 1 in which the said flexible diaphragm cap member is formed of a synthetic resinous plastic material and in which the said elastic flexible diaphragm is substantially annular in form and has a series of substantially annular concentric corrugations formed therein.

8. A safety valve as defined in claim 1 in which the said movable valve member has a threaded valve stem attached thereto, and in which the said threaded valve stem has a manually adjustable member threaded thereon which is adjustable axially along and relative to the said threaded valve stem, and in which the said flexible diaphragm is substantially annular in form and has a series of substantially annular concentric corrugations formed therein, and in which the inner surfaces of the said substantially annular corrugations are disposed in contacting engagement with the outer end portion of the said manually adjustable member.

9. A safety valve as defined in claim 1 in which the said valve housing includes a portion providing an internally threaded valve chamber and in which the said flexible diaphragm is formed as an integral part of an externally threaded diaphragm cap member removably threaded into the said internally threaded portion of the said valve housing.

10. A safety valve as defined in claim 1 in which the said valve housing includes a portion providing an internally threaded valve chamber and in which the said flexible diaphragm is substantially annular in form and is formed as an integral part of and as a wall extending across the outer end portion of a substantially cylindrical diaphragm cap member which is removably threaded into the said internally threaded valve chamber.

11. A safety valve as defined in claim 1 in which the said movable valve member is substantially annular and cup-shaped in form and has a depending substantially annular skirt, and in which the said valve seat is substantially frusto-conical in shape and has a substantially annular groove formed therein upon its upper surface surrounding the said inlet and within the confines of the said depending and substantially annular skirt of the said movable valve member when the said movable valve member is disposed upon the said valve seat.

12. A safety valve as defined in claim 1 in which the said valve housing includes an internally threaded outlet nipple having the said valve outlet formed therein, and in which the said safety valve includes an externally threaded hollow safety plug removably threaded into the said internally threaded valve outlet nipple and having the said rupturable wall formed as an integral part of and extending across and closing the outer end of the said externally threaded hollow safety plug.

13. A safety valve as defined in claim 1 in which the said valve housing includes an externally threaded wall portion providing a substantially cylindrical valve chamber, and in which the said diaphragm cap member is substantially annular in form, and in which the said substantially annular clamping flange is adapted to rest upon the said wall portion of the said substantially cylindrical valve chamber so that the said flexible diaphragm extends thereacross, and in which the said safety valve includes an externally threaded clamping ring adapted to be threaded onto the said externally threaded wall portion of the said substantially cylindrical valve chamber, and in which the said externally threaded clamping ring has a substantially annular inwardly extending clamping flange adapted to extend over and to clamp the said substantially annular clamping flange of the said diaphragm cap member in position upon the said externally threaded wall portion of the said valve housing.

14. A safety valve as defined in claim 1 in which the said valve housing includes an externally threaded wall portion providing a substantially cylindrical valve chamber, and in which the said diaphragm cap member is substantially annular in form, and in which the said substantially annular clamping flange is adapted to rest upon the said wall portion of the said substantially cylindrical valve chamber so that the said flexible diaphragm extends thereacross, and in which the said safety valve includes an externally threaded clamping ring adapted to be threaded onto the said externally threaded wall portion of said substantially cylindrical valve chamber, and in which the said externally threaded clamping ring has a substantially annular inwardly extending clamping flange adapted to extend over and to clamp the said substantially annular clamping flange of the said diaphragm cap member in position upon the said externally threaded wall portion of the said valve housing, and in which the said flexible diaphragm has a series of substantially annular and concentric corrugations formed therein.

15. A safety valve as defined in claim 1 in which the said valve housing includes a substantially cylindrical externally threaded portion, and in which the said diaphragh cap member is substantially annular in form and is internally threaded and is removably threaded onto the said substantially cylindrical externally threaded portion of the said valve housing with the said flexible diaphragm extending thereacross.

16. A safety valve as defined in claim 1 in which the said valve housing includes a substantially cylindrical externally threaded portion, and in which the said diaphragm cap member is substantially annular in form and is internally threaded and is removably threaded onto the said substantially cylindrical externally threaded portion of the said valve housing, and in which the said flexible diaphragm is formed as a substantially flat and uniplanar wall extending across the said valve housing.

17. A safety valve as defined in claim 1 in which the said valve housing includes a substantially cylindrical internally threaded portion, and in which the said diaphragm cap member is substantially annular in form and is externally threaded diaphragm cap removably threaded into the said internally threaded portion of the said valve housing with the said flexible diaphragm extending thereacross.

18. A safety valve as defined in claim 1 in which the said valve housing includes a substantially cylindrical internally threaded portion, and in which the said diaphragm cap member is substantially annular in form and is externally threaded and is removably threaded into the said substantially cylindrical internally threaded portion of the said valve housing, and in which the said flexible diaphragm is formed as a substantially flat and uniplanar wall of the said diaphragm cap member extending across the said substantially cylindrical portion of the said valve housing.

19. A safety valve as defined in claim 1 in which the said diaphragm cap member is substantially annular in form and in which the said valve housing includes a portion providing a substantially cylindrical valve chamber having an externally threaded portion, and in which the said substantially annular diaphragm cap member adapted to rest upon the wall of the said substantially cylindrical externally threaded portion of the said valve housing so that the said flexible diaphragm extends thereacross, and in which the said safety valve includes an internally threaded clamping ring adapted to be threaded onto the said substantially cylindrical externally threaded portion of the said valve housing and having a substantially annular and inwardly extending clamping flange adapted to extend over and to clamp the said substantially annular diaphragm cap member in position upon the said wall of the said substantially cylindrical externally threaded portion of the said valve housing with the said flexible diaphragm forming an end wall extending thereacross, and in which the said safety valve includes a resilient reinforcing and tensioning member extending across the said flexible diaphragm on the outer side of and in contact with the said flexible diaphragm, and in which the said resilient reinforcing and tensioning member has its end portions retained in position by the said inwardly extending and substantially annular clamping flange on the said internally threaded clamping ring.

20. A safety valve as defined in claim 1 in which the said diaphragm cap member is substantially annular in form and in which the said valve housing includes a portion providing a substantially cylindrical valve chamber having an externally threaded portion, and in which the said substantially annular diaphragm cap member adapted to rest upon the wall of the said substantially cylindrical externally threaded portion of the said valve housing so that the said flexible diaphragm extends thereacross, and in which the said safety valve includes an internally threaded clamping ring adapted to be threaded onto the said substantially cylindrical externally threaded portion of the said valve housing and having a substantially annular and inwardly extending clamping flange adapted to extend over and to clamp the said substantially annular diaphragm cap member in position upon the said wall of the said substantially cylindrical externally threaded portion of the said valve housing with the said flexible diaphragm forming an end wall extending thereacross, and in which the said safety valve includes a resilient reinforcing and tensioning member extending across the said flexible diagram on the outer side of and in contact with the said flexible diaphragm, and in which the said resilient reenforcing and tensioning member has its end portions anchored to the inner surface of the said inwardly extending and substantially annular clamping flange on the said internally threaded clamping ring.

21. A safety valve as defined in claim 1 in which the said diaphragm cap member is substantially annular in form and in which the said valve housing includes a portion providing a substantially cylindrical valve chamber having an externally threaded portion, and in which the said substantially annular diaphragm cap member adapted to rest upon the wall of the said substantially cylindrical externally threaded portion of the said valve housing so that the said flexible diaphragm extends thereacross, and in which the said safety valve includes an internally threaded clamping ring adapted to be threaded onto the said substantially cylindrical externally threaded portion of the said valve housing and having a substantially annular and inwardly extending clamping flange adapted to extend over and to clamp the said substantially annular diaphragm cap member in position upon the said wall of the said substantially cylindrical externally threaded portion of the said valve housing with the said flexible diaphragm forming an end wall extending thereacross, and in which the said safety valve includes a resilient reinforcing and tensioning member extending across the said flexible diaphragm on the outer side of and in contact with the said flexible diaphragm, and in which the said resilient reinforcing and tensioning member has its end portions retained in position by the said inwardly extending and substantially annular clamping flange on the said internally threaded clamping ring, and in which the said flexible diaphragm has a series of substantially annular concentric corrugations formed therein, and in which the said resilient reinforcing and tensioning member has a series of correspondingly shaped substantially annular concentric corrugations formed therein complementary to and interfitting with the said substantially annular concentric corrugations in the said flexible diaphragm.

22. A safety valve as defined in claim 1 in which the said diaphragm cap member is substantially annular in form and in which the said valve housing includes a portion providing a substantially cylindrical valve chamber having an externally threaded portion, and in which the said substantially annular diaphragm cap member adapted to rest upon the wall of the said substantially cylindrical externally threaded portion of the said valve housing so that the said flexible diaphragm extends thereacross, and in which the said safety valve includes an internally threaded clamping ring adapted to be threaded onto the said substantially cylindrical externally threaded portion of the said valve housing and having a substantially annular and inwardly extending clamping flange adapted to extend over and to clamp the said substantially annular diaphragm cap member in position upon the said wall of the said substantially cylindrical externally threaded portion of the said valve housing with the said flexible diaphragm forming an end wall extending thereacross, and in which the said safety valve includes a resilient reinforcing and tensioning member extending across the said flexible diaphragm on the outer side of and in contact with the said flexible diaphragm, and in which the said resilient reinforcing and tensioning member has its end portions retained in position by the said inwardly extending and substantially annular clamping flange on the said internally threaded clamping ring, and in which the said resilient reinforcing and tensioning member consists of a band of resilient spring steel extending substantially diametrically across the said flexible diaphragm and having its end portions anchored to the inner surface of the said inwardly extending and substantially annular clamping flange on the said internally threaded clamping ring.

JAMES J. McKEAGUE.

REFERENCES CITED

The following references are of record in the file of this patent:

UNITED STATES PATENTS

| Number | Name | Date |
|---|---|---|
| 224,133 | Brazier | Feb. 3, 1880 |
| 271,067 | Hastings | Jan. 23, 1883 |
| 1,843,068 | Von Wangenheim | Jan. 26, 1932 |
| 1,885,000 | Muller | Oct. 25, 1932 |
| 1,984,868 | Deming | Dec. 18, 1934 |
| 2,047,750 | Smith | July 14, 1936 |
| 2,252,152 | Work | Aug. 12, 1941 |
| 2,322,139 | Kaelin | June 15, 1943 |

FOREIGN PATENTS

| Number | Country | Date |
|---|---|---|
| 14,987 | Australia | Aug. 9, 1928 |

OTHER REFERENCES

Goggin: Vinylidene Chloride Polymers, Industrial and Engineering Chemistry, March 1942.